Figure 1:
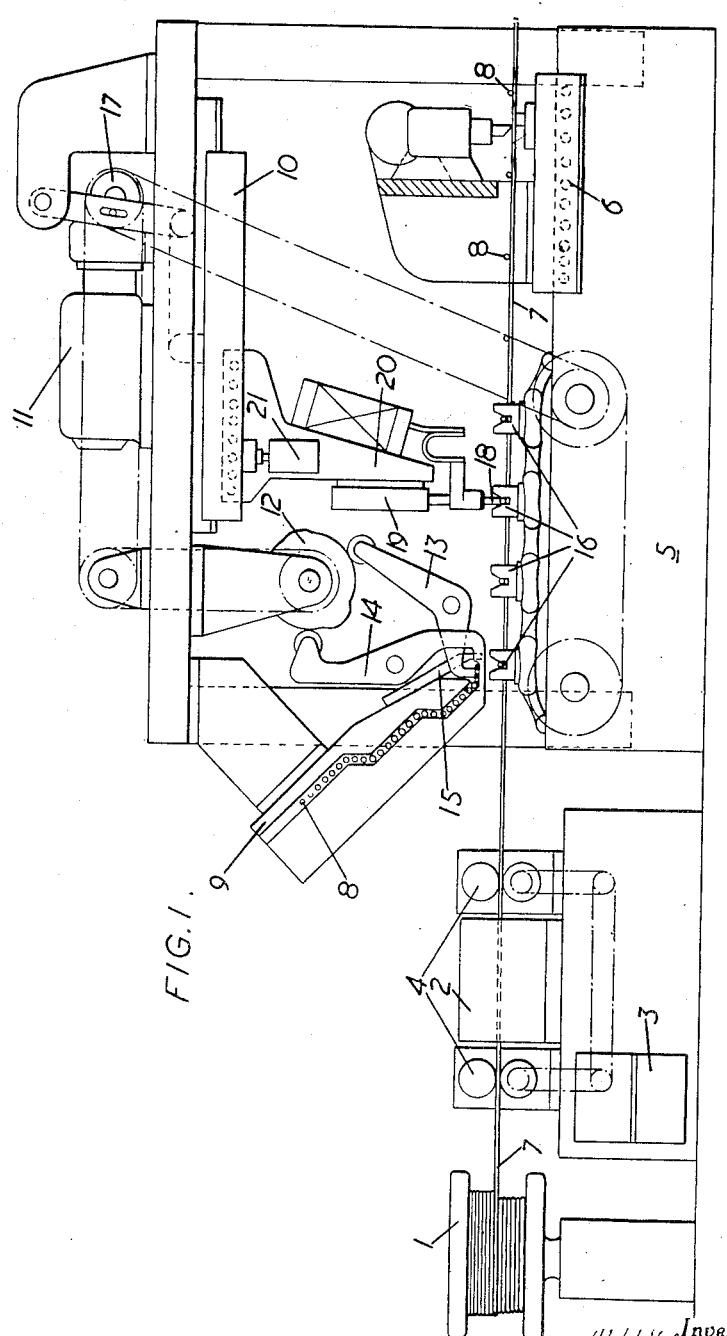

Oct. 18, 1960   W. SCHÄCHTER ET AL   2,957,070
WELDING

Filed March 25, 1958   3 Sheets-Sheet 1

Inventor
WILLY SCHÄCHTER
HEINZ SCHUMACHER
HERBERT LEUPOLD
By Kurt Lehner
AGENT

United States Patent Office 2,957,070
Patented Oct. 18, 1960

2,957,070
WELDING

Willy Schächter, Heinz Schumacher, and Herbert Leüpold, Frankfurt am Main, Germany, assignors to Voigt & Haeffner A.G., Frankfurt am Main, Germany Filed Mar. 25, 1958, Ser. No. 723,758

Claims priority, application Germany Mar. 26, 1957

8 Claims. (Cl. 219—79)

The invention relates to making spot-welded joints between metal parts.

Apparatus for making one or more joints between at least two metal parts which are of any desired cross-section and which are disposed at any desired angle to one another in one or more planes are known. In the case of structural steel latticework, mats or like objects made from flat or round stock a number of joints are made in a single plane between the longitudinal and transverse parts thereof. In the manufacture of lattice girders made of strip or wire material, which serve as reinforcement for concrete in the same way as the aforesaid steel latticework, the components are disposed at an angle to one another in three dimensions and the joints between them are likewise arranged spatially.

The aforementioned steel mats have hitherto been made by a process in which the components are passed stepwise through a welding machine, the welding always taking place when the components are stationary. When lattice girders are likewise made by an interittent feeding process similar to the known process for the construction of steel mats, an improvement in the method of production is obtained but something still better is called for in order to facilitate a truly cheap mass-production of such lattice girders.

The invention is based on this consideration and aims to provide a machine by means of which spot-welded uniplanar or three-dimensional articles can be produced in large numbers at relatively low costs. We have found that such articles can be mass-produced cheaply if the machine for making them operates continuously as well as fully automatically because any loss of time caused by the standstill periods in the intermittent process and the resultant reduction in the rate of output are thus avoided. Apparatus operating on the intermittent process requires that one or more loops of the material to be welded be formed between the welding station and the reels supplying the material, so as to compensate for the jerky feed of the material through the installation. The space occupied by these compensating loops necessarily increases the overall dimensions of the installation and its weight and the invention thus dispenses with compensating loops.

In accordance with the invention a machine for making welded articles is therefore so designed that one or more components for the article are fed continuously lengthwise through the machine, connecting or lattice members for the said components being introduced at any desired angle to the direction of feed to be supported thereby after the components have been fed a predetermined distance, whereafter the connecting or lattice members are spot-welded to the components carrying them by means which participate in the feeding movement during welding and which are returned to their starting position after welding.

Figure 2:
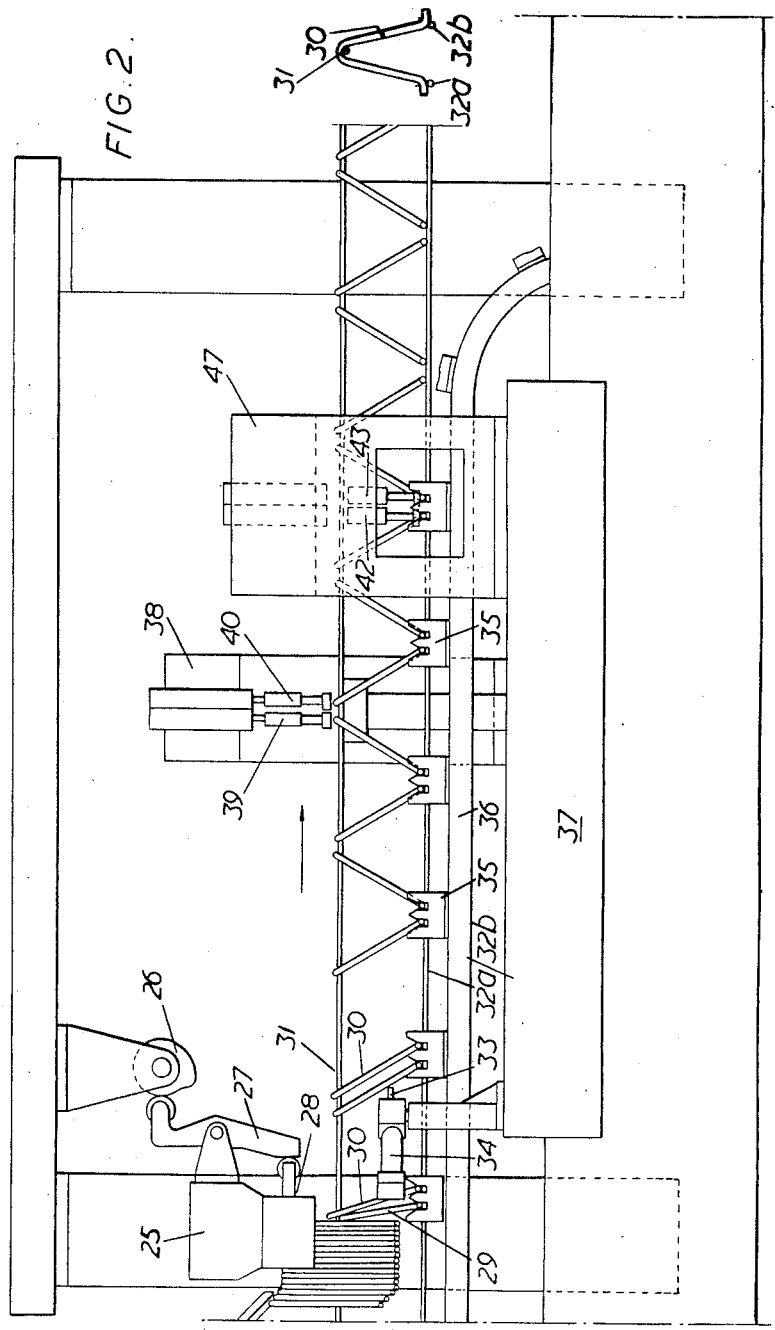
Figure 3:
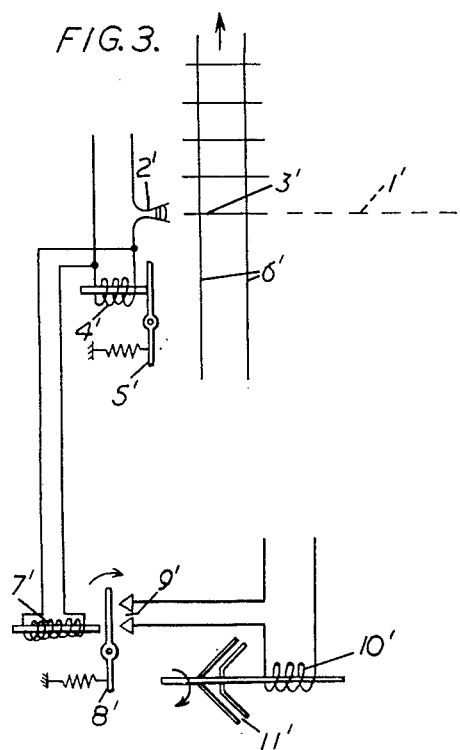

The invention will be more fully explained with reference to the examples illustrated in the accompanying drawings, in which:

Fig. 1 is a diagrammatic side view of a machine for making uniplanar lattice work or mats, Fig. 2 is a similar view of a machine for making three-dimensional lattice girders, and Fig. 3 is a schematic view of a control system for the machine of Fig. 1 or 2.

Referring to Fig. 1, the machine essentially comprises reels 1 containing wire material, wire trueing means 2, a main drive 3 with draw checks 4, welding means 5 proper and severing means 6. The endless round steel wires 7 (basic mat material) drawn continuously at constant speed from the reel 1 and guided in parallel juxtaposed relationship are pulled through the trueing means 2 by the main drive 3 with the aid of the pairs of draw checks 4 and guided into the welding device 5.

In an installation disposed laterally of the aforementioned arrangement, but not shown in the drawing, transverse connecting or lattice members 8 for the wires 7 are also drawn from reels, trued, cut to lengths in conformity with the desired mat width and thereafter fed to the magazine 9.

A welding carriage 10 is provided with a drive 11, which drives a cam disc 12 controlling ejector elements at the magazine 9. The cam disc 12 acts on two levers 13, 14. The lever 13 blocks all the members 8 in the magazine 9 except the one nearest the magazine outlet which is held by the lever 14. When the lever 14 is lifted, the outlet from the magazine is freed and a connecting member 8 is released to be ejected under the influence of fingers 15. The ejected member 8 is received in one of the seatings 16, which are advanced at the same speed as the basic mat material 7. The ejector elements at the magazine could be controlled by the main drive 3 for the continuous feed of the basic mat material 7 in stead of by the drive for the welding carriage 10. It would also be possible to control the ejection of the connecting members 8 from the magazine 9 by non-mechanical means, for example by means of photoelectric cells. Such cells, as is shown in Fig. 3, may be actuated by the passing connecting members 8 and/or seatings 16 and could energise an electromagnet which opens or closes a flap at the outlet from the magazine 9.

The drive 11 for the welding carriage 10 at the same time operates a conveyor chain for the seatings 16 and a crank guide 17. The crank guide must be so designed and its speed must be so chosen that one rotation thereof produces a forward movement of the basic mat material by the amount of its pitch, i.e. by the distance between two connecting member 8 in the finished latticework. This ensures synchronous speeds between the basic mat material 7 and the welding carriage 10. The commencement of the movement of the welding carriage 10 could also be initiated by photoelectric cells influenced by ejection of the connecting members 8 from the magazine.

Fig. 3 illustrates a control mechanism incorporating an optical cell 2' upon which impinges a light ray 1'. The cell 2' is so positioned that the seatings of the connecting members 3' (corresponding to parts 16 and 8, respectively, in Fig. 1) pass between the non-represented source of light ray 1' and the cell 2'; the latter then opens a circuit including an electromagnet 4' which operates a closure flap 5' on the non-represented magazine for connecting members 3'. The flap 5' then allows one or more connecting members 3' to drop on to the wires 6', the latter corresponding to wire or wires 7 in Fig. 1. Fig. 3 further shows an operative connection between the optical cell 2' and a non-represented welding carriage corresponding to part 10 in Fig. 1. The connection comprises an electromagnet 7' which is energized by member 2' when the light ray 1' is interrupted by a connecting member 3'. Electromagnet 7' then closes two contacts 9' to energize a further electromagnet 10' in the circuit of a clutch 11'. The assembly of parts 10', 11' is installed on the ouput shaft of a continuously running motor (not shown) which can bring about movements of the welding carriage; thus, when the clutch 11' is operated by the energized electromagnet 10', the forward movement of the welding carriage and of the electrodes commences immediately. The period of time during which this feed takes place may be controlled by an electronic timing device 10 which, as is known, is variable within wide limits.

The welding carriage 10 supports electrodes 18, which are applied by means of pressure cylinders 19 at the instant when a connecting member 8 is located immediately below the electrodes 18 and when the speed of the welding carriage 10 is identical in direction and magnitude with the speed of the basic mat material 7. The electrodes 18 are also applied by the drive 11 through a cam-controlled slide valve (not shown). A traverse 20 mounted on rollers opposite the welding carriage 10 and supporting the cylinders 19 is rigidly coupled to the welding carriage 10 by locking means 21. As soon as the electrodes 18 have moved together, the locking means 21 are released in order that differences in the travel of the traverse 20 and the welding carriage 10 occasioned by any small differences in speed between the material 7, 8 to be welded and the welding carriage 10 may be cancelled out. Thus, the aforesaid means produce complete synchronism between the speed of the welding carriage and the speed of advance of the basic mat material. When the welding operation has been completed, the carriage 10 returns to its starting position. This return movement of the carriage may be self actuated in that, for example, the carriage makes contact with a limit switch, the impulses from which energize an electronic control. Of course the return movement of the welding carriage may also be effected by purely mechanical means.

Figure 2 illustrates a machine for making lattice girders, that is to say, girders in which the upper and lower booms of any desired cross-sectional shape are interconnected by means of lattice or web members to form three-dimensional structures of high mechanical strength.

Figure 2 shows only those parts which are necessary for an understanding of the manner of operation of the lattice-girder machine. Parts which are substantially identical with parts of the constructional example illustrated in Figure 1 have been omitted. These include the reels, from which the material for the upper and lower booms of the girder are withdrawn continuously in endless lengths, the drive and the means for the continuous feed of the boom material through the machine and the severing means.

In Figure 2, the ejection of the connecting or lattice members, which have first been bent into V-shape, from a magazine 25 is likewise effected by a cam disc 26 which acts through a lever 27 on a locking and releasing member 28. The latter controls the ejector elements, and two lattice members 29, 30 fall from the storage device at a time. These two lattice members are first carried along in the direction of advancement under the action of the forward feed movement of the upper boom 31 and the lower booms 32a, 32b. After a predetermined distance, a push member 33 of an aligning device 34 acts on the foremost lattice member 30 and tilts it into its proper position in relation to the upper and lower booms, this position being evident from the drawing.

The lattice members 29, 30 are held in seatings 35 in the region of the lower booms, the seatings being carried by a conveyor belt 36 operatively coupled to the welding carriage 37. After having covered a predetermined distance, the upper boom 31 and the two lattice members resting thereon pass under the first welding device 38, the electrodes 39, 40 of which descend and spot-weld the two lattice members to the upper boom 31. After travelling some further distance, the lattice members are welded to the two lower booms by the welding device 41, which also comprises two electrodes 42, 43 each of which spot welds the end of one lattice member to its respective lower boom. As in Fig. 1, the welding devices 38, 41 are advanced during welding at a speed which is the same as that with which the booms are fed through the machine.

Synchronism between the welding carriage and the feed means for the boom material may be effected, for example, in that the drive which determines the feeding speed of the boom material also drives a generator, having a frequency which determines the speed of the drive for the welding carriage. Alternatively, a direct-current motor could be employed to drive the welding carriage, the speed of rotation of the motor being governed by the main drive for the boom material.

We claim:

1. A machine for making welded articles comprising, in combination: a supply of a first component of the articles; a supply of second components of the articles; means for continuously feeding the first component from said first mentioned supply at a given speed in a first direction; means for delivering second components from said last mentioned supply at intervals in a second direction at an angle to said first direction into supported contact with the first component whereupon the first component and the second components advance in unison in said first direction; means for spot-welding the second components to the first component; means for first advancing said spot-welding means from a starting position toward each one of the second components while the latter is supported by and moves with the first component and for thereupon advancing the spot-welding means in said first direction at a speed at which the first component is fed whereby the second components are welded to the first component while advancing therewith in said first direction; means for returning the spot-welding means into said starting position after the completion of a welding operation; a magazine for receiving said supply of second components, the magazine having a flap; spaced seatings for the second components operatively connected for movements with the feeding means in said first direction; electromagnet means operatively connected with said flap; and an optical cell for energizing said electromagnet means and so installed in said machine as to be influenced by the passage of said seatings whereby to energize said electromagnet means, the latter operating said flap to release at least one second component from said magazine.

2. A machine for making welded articles comprising, in combination: a supply of a first component of the articles; a supply of second components of the articles; means for continuously feeding the first component from said first mentioned supply at a given speed in a first direction; means for delivering second components from said last mentioned supply at intervals in a second direction at an angle to said first direction into supported contact with the first component whereupon the first component and the second components advance in unison in said first direction; means for spot-welding the second components to the first component; means for first advancing said spot-welding means from a starting position toward each one of the second components while the latter is supported by and moves with the first component and for thereupon advancing the spot-welding means in said first direction at a speed at which the first component is fed whereby the second components are welded to the first component while advancing therewith in said first direction, said advancing means comprising a carriage, means for moving said carriage, and an optical cell for operating said last mentioned means so installed in said machine as to be influenced by each second component delivered from said supply of second components for causing movements of the carriage in said first direction; and means for returning the spot-welding means into said starting position after the completion of a welding operation.

3. The combination as set forth in claim 2, wherein the means for advancing said spot-welding means comprises a carriage and further comprising means for synchronizing the movements of the feeding means of the carriage in said first direction, said synchronizing means comprising a crank guide so connected with said feeding means as to perform one revolution when the first component is fed a distance equal to that between successively delivered second components.

4. A machine for making welded articles comprising, in combination: a supply of a first component of the articles; a supply of second components of the articles; means for continuously feeding the first component from said first mentioned supply at a given speed in a first direction; means for delivering second components from said last mentioned supply at intervals in a second direction at an angle to said first direction into supported contact with the first component whereupon the first component and the second components advance in unison in said first direction; means for spot-welding the second components to the first component; means for first advancing said spot-welding means from a starting position toward each one of the second components while the latter is supported by the moves with the first component and for thereupon advancing the spot-welding means in said first direction at a speed at which the first component is fed whereby the second components are welded to the first component while advancing therewith in said first direction; means for returning the spot-welding means into said starting position after the completion of a welding operation; and severing means connected for movements with said spot-welding means and situated rearwardly of the latter as seen in said first direction for severing the first component after welding of at least one second component thereto.

5. A machine for making lattice girders comprising, in combination: at least one upper and at least one lower reel of wire-like material; means for continuously drawing the material from said reels in parallelism with each other in a first direction, the material drawn from each upper reel constituting the upper boom and the material drawn from each lower reel constituting the lower boom of the girders; a magazine; a supply of prefabricated lattice members in said magazine; means for discharging lattice members from said magazine into supported contact with said booms in a second direction substantially perpendicular to said first direction whereupon the lattice members move with the booms in said first direction; means for positioning and holding the lattice members in spaced relationship on the booms; means for spot-welding the lattice members to the booms; means for advancing said spot-welding means first from a starting position toward the lattice members while the latter are supported and positioned on and move with the booms in said first direction, and for thereupon moving said spot-welding means in said first direction whereby the lattice members are welded to the booms while advancing with the latter in said first direction; and means for returning the spot-welding means into starting position after the completion of a welding operation.

6. The combination as set forth in claim 5, wherein the means for advancing said spot-welding means comprises a carriage and said positioning means comprises a conveyor connected with said carriage and including seatings for holding the lattice members while the latter are in supported contact with the booms.

7. The combination as set forth in claim 6, wherein the means for advancing said spot-welding means comprises a carriage, and further comprising means for synchronizing the movements of said carriage with the movements of said drawing means.

8. The combination as set forth in claim 7, wherein said synchronizing means comprises generator means driven by said drawing means and operatively connected with said carriage in such manner that the frequency thereof determines the speed of said carriage.

References Cited in the file of this patent

UNITED STATES PATENTS

| | | |
|---|---|---|
| 1,448,566 | Muller et al. | Mar. 13, 1923 |
| 1,554,030 | Reed | Sept. 15, 1925 |
| 1,694,081 | Reed | Dec. 4, 1928 |
| 1,866,382 | White | July 5, 1932 |
| 2,414,905 | Seltzer | Jan. 28, 1947 |
| 2,422,829 | Fotie | June 24, 1947 |
| 2,497,260 | Griesemer | Feb. 14, 1950 |
| 2,529,556 | Keller | Nov. 14, 1950 |